(Model.)

E. W. FREE.
GRAIN AND FERTILIZER SPREADING ATTACHMENT FOR DRILLS.

No. 277,260.   Patented May 8, 1883.

WITNESSES:
Chas. Niola
C. Sedgwick

INVENTOR:
E. W. Free
BY Munn & Co
ATTORNEYS.

UNITED STATES PATENT OFFICE.

ELI W. FREE, OF BALTIMORE, MARYLAND.

GRAIN AND FERTILIZER SPREADING ATTACHMENT FOR DRILLS.

SPECIFICATION forming part of Letters Patent No. 277,260, dated May 8, 1883.

Application filed October 18, 1882. (Model.)

*To all whom it may concern:*

Be it known that I, ELI W. FREE, of Baltimore, in the county of Baltimore and State of Maryland, have invented a new and useful Improvement in Grain and Fertilizer Spreading Attachments for Drills, of which the following is a full, clear, and exact description.

Reference is to be had to the accompanying drawings, forming part of this specification, in which similar letters of reference indicate corresponding parts in all the figures.

Figure 1:
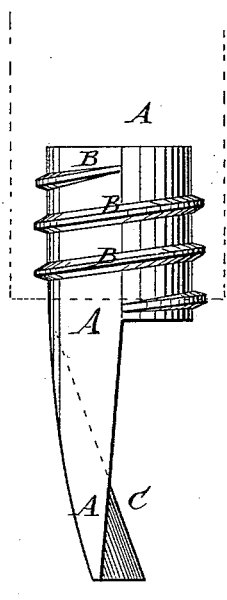
Figure 3:
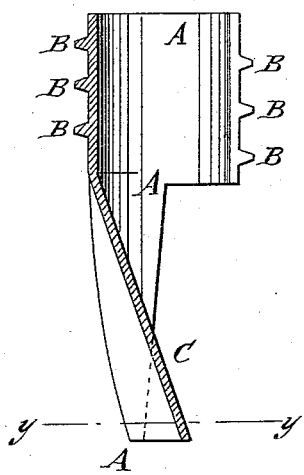
Figure 2:
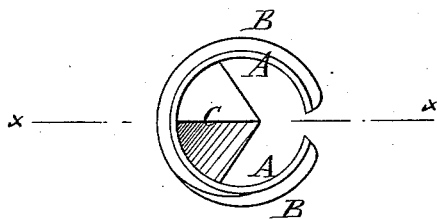
Figure 4:

Figure 1 is a side elevation of the attachment. Fig. 2 is a plan view of the same. Fig. 3 is a sectional side elevation of the same, taken through the line $x\ x$, Fig. 2. Fig. 4 is a sectional plan view of the same, taken through the line $y\ y$, Fig. 3.

This invention relates to that class of drills employing spreaders adapted to receive the fertilizer or seed directly upon and spread or spray the same by means of a conical surface, or to first receive it in a hopper, whence it passes through a neck or passage, and then falls upon a rounded or convex surface, to cause the spreading or spraying of the seed or fertilizer.

The invention consists in a grain and fertilizer spreading attachment for drills, made of a split tube provided with an exterior screw-thread, and having its lower forward part cut away, and an angular forwardly-projecting incline formed upon or attached to the forward side of its lower rear part to adapt the spreader to be attached to the flexible conductor-tube placed in the rear of the plow or in the boot of the said plow, as will be hereinafter fully described.

A represents the spreader, the upper part of which is made in the form of a split tube, so that it can be expanded and contracted to fit conductor-tubes of different sizes.

Upon the outer surface of the tubular upper part of the spreader A is formed a screw-thread, B, to adapt it to be screwed into the lower end of the flexible tube that conducts the seed from the seed-box of the drill to the ground, and which is secured to the plow-standard, or is inserted in the hollow of the standard or in the boot of the plow, so as to discharge the seed or fertilizer close in the rear of the plow before the furrow has had time to be partially filled by the falling in of the soil. The forward lower part of the spreader is cut away, as shown in Figs. 1 and 3, to allow the seed to escape toward the plow.

Upon the lower rear part of the spreader A is formed an angular forwardly-projecting incline, C, as shown in Figs. 1, 2, 3, and 4.

With this construction, as the grain or fertilizer falls from the flexible conducting-tube into the spreader A it strikes the angular incline C, and is scattered or spread so as to be distributed over a wide strip of ground.

To give the best effect to the spreader it should be used in connection with a wide plow.

Having thus described my invention, what I claim as new, and desire to secure by Letters Patent, is—

1. In a grain and fertilizer spreader for drills, the split tube A, having its lower forward part cut away, and an angular forwardly-projecting incline, C, upon its lower rear part, substantially as herein shown and described, whereby the grain or fertilizer will be distributed over a wide space as it falls to the ground, as set forth.

2. A grain and fertilizer spreader for drills, made, substantially as herein shown and described, of the split tube A, provided with an exterior screw-thread, and having its lower forward part cut away, and an angular forwardly-projecting incline, C, upon its lower rear part to adapt it to be attached to the flexible conductor-tube of the drill in the rear of the plow, as set forth.

ELI W. FREE.

Witnesses:
GEO. W. BURTON,
JOHN WILLIAMS.